(12) United States Patent
Shi

(10) Patent No.: US 8,700,036 B2
(45) Date of Patent: Apr. 15, 2014

(54) METHOD FOR RESOLVING CONFLICT BETWEEN NETWORK SEARCHING AND TRAFFIC AND MULTI-CARD MULTI-STANDBY MOBILE PHONE

(75) Inventor: Feng Shi, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/104,745

(22) Filed: May 10, 2011

(65) Prior Publication Data

US 2012/0021734 A1 Jan. 26, 2012

(30) Foreign Application Priority Data

Jul. 23, 2010 (CN) .......................... 2010 1 0240588

(51) Int. Cl.
*H04W 4/00* (2009.01)
(52) U.S. Cl.
USPC ...................................... 455/434; 455/422.1
(58) Field of Classification Search
USPC ........ 455/558, 509, 434, 435.1, 435.2, 435.3, 455/436, 450, 422.1, 552.1
See application file for complete search history.

(56) References Cited

U.S. PATENT DOCUMENTS

| | | | |
|---|---|---|---|
| 2009/0156256 A1* | 6/2009 | Shi | 455/558 |
| 2009/0170501 A1* | 7/2009 | Olson | 455/425 |
| 2010/0093349 A1* | 4/2010 | Gandhi et al. | 455/435.2 |

FOREIGN PATENT DOCUMENTS

| | | |
|---|---|---|
| CN | 1784025 A | 6/2006 |
| CN | 101179796 A | 5/2008 |
| CN | 101184292 A | 5/2008 |

* cited by examiner

*Primary Examiner* — George Eng
*Assistant Examiner* — Hung Du
(74) *Attorney, Agent, or Firm* — Kilpatrick Townsend & Stockton LLP

(57) ABSTRACT

A method for resolving conflict between network searching and traffic includes: determining if a service request corresponds to mobile originated traffic or mobile terminated traffic, when a second user card receives the service request during a process of the network searching of a first user card; temporarily suspending the mobile originated traffic and continuing to perform the network searching of the first user card, when the service request corresponds to the mobile originated traffic; and temporarily suspending the network searching of the first user card, firstly processing the mobile terminated traffic, and continuing to perform the network searching of the first user card after completing the mobile terminated traffic, when the service request corresponds to the mobile terminated traffic. A multi-card multi-standby mobile phone of the present invention includes at least two types of user card, a communication unit for transmitting communication information, a microcontroller unit and a determining unit. The present invention avoids impact of the network searching to the mobile originated traffic and the mobile terminated traffic.

9 Claims, 3 Drawing Sheets

METHOD FOR RESOLVING CONFLICT BETWEEN NETWORK SEARCHING AND TRAFFIC AND MULTI-CARD MULTI-STANDBY MOBILE PHONE

CROSS-REFERENCE TO RELATED APPLICATIONS

The present application claims the priority of Chinese Patent Application No 201010240588.X, entitled "method for resolving conflict between network searching and traffic and multi-card multi-standby mobile phone", and filed Jul. 23, 2010, the entire disclosure of which is incorporated herein by reference.

FIELD OF THE INVENTION

The present invention relates to the field of wireless communication, and particularly to a method for resolving conflict between network searching and traffic, and a multi-card multi-standby mobile phone.

BACKGROUND OF THE INVENTION

Mobile phones have advantages of mobility, safety and stability, and are commonly used for wireless communication in people's routine life and work.

Normally, mobile phones have to search network when turning on, losing network, roaming among different Public Land Mobile Networks (PLMN) or after camping on a network for emergency calling.

A method for searching network when a wireless communication device loses network, is disclosed in Chinese patent application with publication No. CN1784025A. FIG. 1 schematically illustrates a flow chart of a method for searching network. In this method, a wireless communication device starts network searching when losing network, and starts the next network searching if the interval between adjacent network searching that is prescribed as an initial value of a timer has elapsed. The interval between two adjacent network searching is slightly larger than a previous interval between the two adjacent network searching. In this way, electric power is saved without adverse influence on speed of network searching.

A multi-card multi-standby mobile phone comprises at least two Subscriber Identity Module (SIM) cards for communicating with different wireless communication service provider. Network searching is needed once one SIM card in the mobile phone loses connection with the wireless communication service provider. However, other SIM cards in the mobile phone are still in the normal communication state for receiving service requests. The multi-card multi-standby mobile phone includes only one antenna for sending/receiving communication information, and thus the mobile phone cannot simultaneously perform network searching and mobile originated traffic, i.e. call service, short messages, Bluetooth and so on, which are sent from a mobile phone to other wireless communication devices, and mobile terminated traffic, i.e. call service, short messages, Bluetooth and so on, which are sent from other wireless communication devices to a mobile phone. Furthermore, a mobile phone may take much time to search network, significantly impeding mobile originated traffic and mobile terminated traffic of the mobile phone.

Therefore, it is desired for the skilled persons in the art to resolve the conflict between network searching and traffic thereby preventing against adverse influence of network searching and traffic.

SUMMARY OF THE INVENTION

The present invention provides a method for resolving conflict between network searching and traffic, thereby avoiding impact of the network searching to the traffic.

The present invention provides a method for resolving conflict between network searching and traffic. The method includes: determining if a service request corresponds to mobile originated traffic or mobile terminated traffic, when a second user card receives the service request during a process of the network searching of a first user card; temporarily suspending the mobile originated traffic and continuing to perform the network searching of the first user card, when the service request corresponds to the mobile originated traffic; and temporarily suspending the network searching of the first user card, processing the mobile terminated traffic firstly, and continuing to perform the network searching of the first user card after completing the mobile terminated traffic, when the service request corresponds to the mobile terminated traffic.

When temporarily suspending the mobile originated traffic and continuing to perform the network searching of the first user card, time for the network searching is measured and whether the time for the network searching reaches a first time threshold is determined, processing the mobile originated traffic of the second user card after completing the network searching if the time for the network searching does not reach the first time threshold, and stopping the network searching, restoring processing the mobile originated traffic of the second user card and performing the network searching after completing the mobile originated traffic if the time for the network searching reaches the first time threshold.

The first time threshold is 5 s.

Before temporarily suspending the mobile originated traffic, when a frequency point for camping on is found and system information has not been received completely during the process of the network searching of the first user card, the first time threshold is 2 s.

The mobile originated traffic includes a call service, a short message service and Bluetooth, which are sent from the mobile phone to other wireless communication devices.

The mobile terminated traffic includes a call service, a short message service and Bluetooth, which are sent from other wireless communication devices to the mobile phone.

When the service request corresponds to the mobile terminated traffic, after suspending the network searching of the first user card, network searching information is stored and mobile terminated traffic is processed, the network searching of the first user card being continued to be performed according to the stored network searching information when time for processing the mobile terminated traffic does not reach a second time threshold.

The network searching of the first user card is restarted when the time for processing the mobile terminated traffic reaches the second time threshold.

The method further includes presetting the second time threshold in the mobile phone.

Correspondingly, the present invention provides a multi-card multi-standby mobile phone. The mobile phone includes: at least two types of user cards; a communication unit for transmitting communication information; a microcontroller unit for processing network searching and traffic, when a second user card receives a service request during a process of the network searching of a first user card, starting a determining unit and receiving a determining result from a determining unit; if the determining result shows that the service request corresponds to mobile originated traffic, temporarily suspending the mobile originated traffic and continuing to perform the network searching of the first user card; if the determining result shows that the service request corresponds to mobile terminated traffic, temporarily suspending the network searching of the first user card, processing mobile terminated traffic firstly, and continuing to perform the network searching of the first user card after completing the mobile terminated traffic; and the determining unit for determining if the service request corresponds to the mobile originated traffic or the mobile terminated traffic.

The multi-card multi-standby mobile phone further comprises a first timer unit and a first comparing unit which are connected to the microcontroller unit respectively, wherein, when the determining result shows that the service request corresponds to the mobile originated traffic and the mobile originated traffic is temporarily suspended and the network searching of the first user card is performed, the microcontroller unit is for starting the first timer unit, and receiving a comparing result from the first comparing unit; if the comparing result shows that time for the network searching does not reach a first time threshold, processing the mobile originated traffic after completing the network searching; if the comparing result shows that the time for the network searching reaches the first time threshold, stopping the network searching, restoring the mobile originated traffic and performing the network searching after completing the mobile originated traffic; wherein the first timer unit is for measuring the time for the network searching of the first user card after the first timer unit being started; and wherein the first comparing unit set with the first time threshold is for comparing the time for network searching measured by the first timer unit with the first time threshold, and sending the comparing result to the microcontroller unit.

The multi-card multi-standby mobile phone further comprises a memory, a second timer unit and a second comparing unit which are connected to the microcontroller unit respectively, wherein, when a determining result shows that the service request corresponds to the mobile terminated traffic and the network searching of the first user card is temporarily suspended, the microcontroller unit is for storing network searching information of the first user card in the memory, processing the mobile terminated traffic, starting the second timer unit, receiving a comparing result from the second comparing unit, continuing to perform the network searching of the first user card according to the network searching information stored in the memory after completing processing the mobile terminated traffic if the comparing result shows that time for processing the mobile terminated traffic does not reach a second time threshold, and restarting the network searching after processing the mobile terminated traffic if the comparing result shows that time for processing the mobile terminated traffic reaches the second time threshold; the memory being for storing the network searching information; the second timer unit being for measuring the time for processing the mobile terminated traffic when the second timer unit is started; and the second comparing unit set with the second time threshold, being for comparing the time for processing the mobile terminated traffic measured by the second timer unit with the second time threshold, and sending the comparing result to the microcontroller unit In comparison with conventional technologies, the present invention has the following advantages: according to the mobile originated traffic and the mobile terminated traffic, different priorities are set for the network searching and the traffic respectively. When the conflict occurs between the network searching and the traffic, the network searching and the traffic will be successfully completed according to the preset priories. For the conflict between the network searching and the mobile terminated traffic, the mobile terminated traffic is firstly processed, thereby avoiding impact of the network searching to the mobile terminated traffic.

For the conflict between the network searching and the mobile originated traffic, the mobile originated traffic is firstly delayed by a period of time and the network searching is performed, thereby raising the efficiency of the network searching. Moreover, a time threshold is set for the network searching, thus decreasing the delay time of the mobile originated traffic and the impact of the network searching to the mobile originated traffic.

DETAILED DESCRIPTION OF THE INVENTION

In order that objective, characteristics and advantages of the invention are understood more clearly, the invention is interpreted with embodiments in combination with accompanied drawings.

Numerous design details are described hereinafter for a better understanding of the invention. However, the invention can be implemented in other ways different from these described herein. Therefore, the invention shall not be limited to the embodiments described below.

A multi-card multi-standby mobile phone will start to search network when in use, one user card loses contact with a wireless communication service provider. It will take much time to search network, and a procedure of network searching is divided into multiple steps. Other user cards may receive service requests among the steps of network searching. The service requests may be sent from current user to other wireless communication device for mobile originated traffics such as call, short message, and Bluetooth etc, otherwise may be sent from other wireless communication device to the current user for mobile terminated traffics such as call, short message, and Bluetooth etc.

Figure 1:
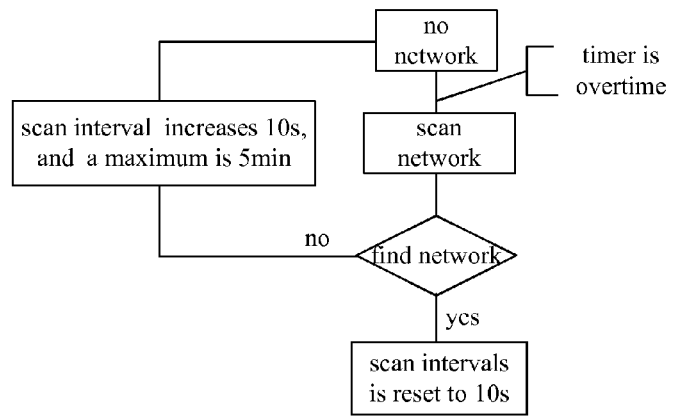
FIG. 1 is a schematic flow chart of a network searching method in prior art.
Figure 2:
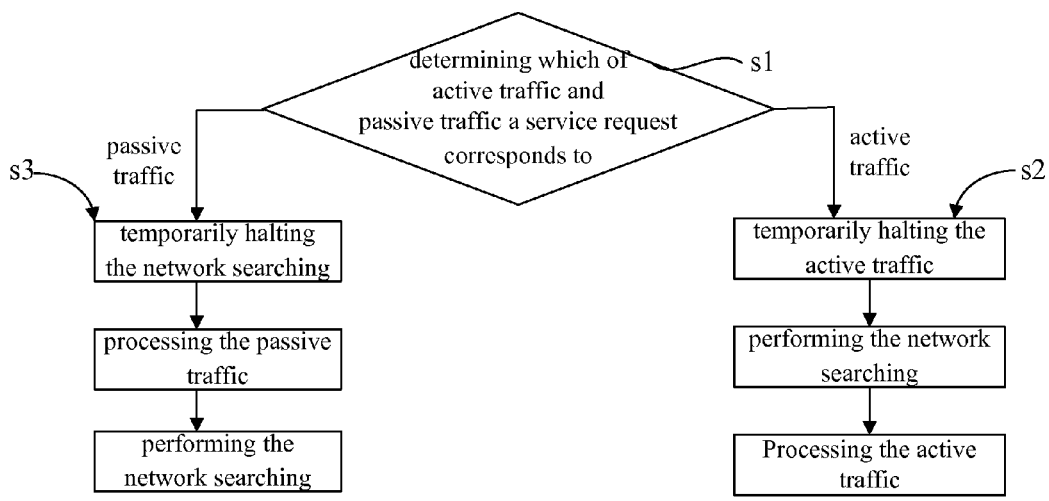
FIG. 2 is a schematic flow chart of a method for resolving conflict between network searching and traffic according to an embodiment of the invention.

A method for resolving conflict between network searching and traffic is disclosed. FIG. 2 is a schematic flow chart of the method for resolving conflict between network searching and traffic according to an embodiment of the invention. During the process of the network searching of a first user card, when a second user card receives a service request, the method includes:

Step s1: determining if the service request corresponds to mobile originated traffic or mobile terminated traffic;

Step s2: when the service request corresponds to the mobile originated traffic, temporarily suspending the mobile originated traffic, and continuing to perform the network searching of the first user card; and Step s3: when the service request corresponds to the mobile terminated traffic, temporarily suspending the network searching of the first user card, processing the mobile terminated traffic firstly, and continuing to perform the network searching of the first user card after completing the mobile terminated traffic.

The method will be described step by step in detail below.

Specifically, In the Step s1, if the received service request corresponds to the mobile originated traffic or the mobile terminated traffic is determining by a determining unit of a mobile phone.

In the Step s2, when the service request corresponds to the mobile originated traffic, under control of a microcontroller unit, the mobile originated traffic of the second user card is temporarily suspended, the network searching of the first user card is continued to be performed then, and the mobile originated traffic of the second user card is finally processed.

Figure 3:
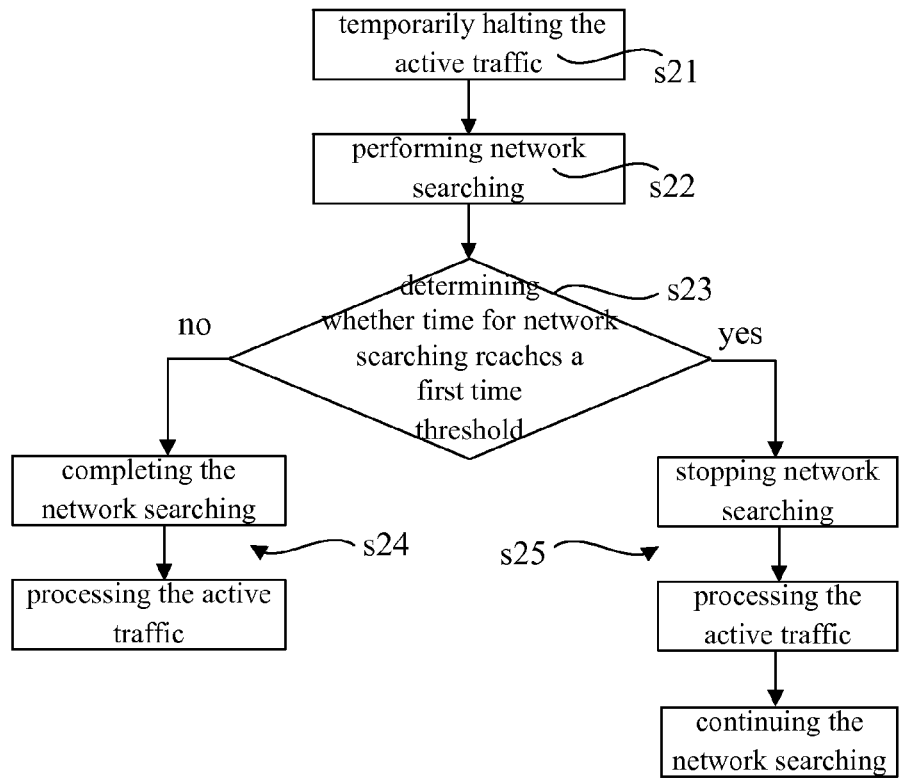
FIG. 3 is a schematic flow chart of the step s2 of the method in FIG. 2 according to an embodiment of the invention.

FIG. 3 schematically shows the step s2 of the method in FIG. 2 according to an embodiment of the invention, which includes:

Step s21, temporarily suspending the mobile originated traffic;

Step s22, performing network searching of the first user card;

Step s23, determining whether time for the network searching reaches a first time threshold;

Step s24, when the time for the network searching does not reach the first time threshold, after completing the network searching, processing the mobile originated traffic of the first user card; and Step s25, when the time for the network searching reaches the first time threshold, stopping network searching, restoring the mobile originated traffic of the second user card, and processing the network searching of the first user card after completing the mobile originated traffic.

In the Step s23, the first time threshold is preset in a mobile phone. For example, the first time threshold is 5 s. Specifically, when performing the network searching of the first user card, time for the network searching is measured. The time for the network searching compares with the first time threshold for determining whether the time for the network searching reaches the first time threshold.

When temporarily suspending the mobile originated traffic of the second user card and performing the network searching of the first user card, if the time for the network searching for the first user card is short and the network searching is completed within the first time threshold, the mobile originated traffic of the second user card starts. If the time for the network searching of the first user card is long and the network searching is not completed within the first time threshold, the network searching of the first user card is stopped until the time for the network searching reaches the first time threshold, and then the mobile originated traffic of the second user card starts. The mobile originated traffic of the second user card will not be delayed for much time, thereby decreasing impact of the network searching to the traffic of the mobile phone.

In the Step s2, in a preferred embodiment, when a frequency point for camping on is found during the network searching of the first user card and system information has not been received completely, the mobile originated traffic of the second user card is temporarily suspended. During the time period in which the mobile originated traffic of the second user card is temporarily suspended, the system information of the frequency point is received during the network searching of the first user card. The time for receiving the frequency system information is very short, e.g. normally within two seconds, delayed time of the mobile originated traffic of the second user card is relatively short without obstructing the use of the mobile phone. During the delayed time, the first user card may find an appropriate frequency point for camping on, and thus the network searching is completed. In this way the efficiency of the network searching is raised. It should be noted that in a preferred embodiment, the time threshold may be set as two seconds.

In the step s3, when the determining unit determines that the received service request corresponds to the mobile terminated traffic, in order to avoid impact of the network searching to the mobile terminated traffic, the microcontroller unit stops the network searching of the first user card firstly. The mobile terminated traffic of the second user card is processed. Finally, the network searching of the first user card is performed.

Figure 4:
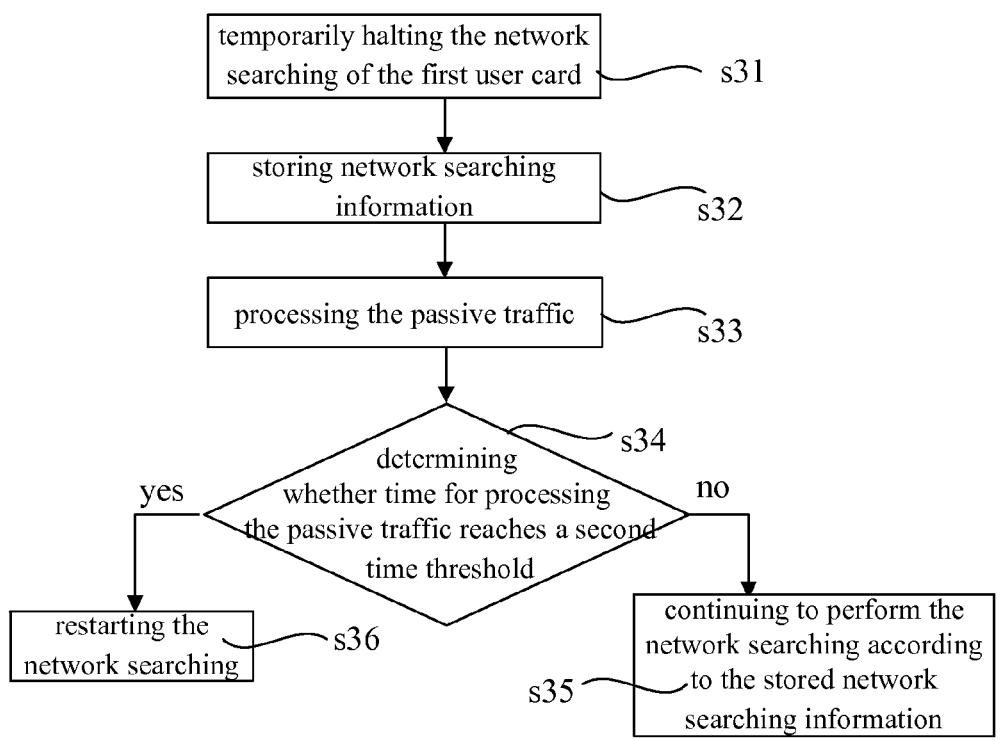
FIG. 4 is a schematic flow chart of the step s3 of the method in FIG. 2 according to an embodiment of the invention.

FIG. 4 is a schematic flow chart of the step s3 of the method in FIG. 2 according to an embodiment of the invention. The step s3 comprises:

Step s31, temporarily suspending the network searching of the first user card;

Step s32, storing network searching information;

Step s33, processing mobile terminated traffic;

Step s34, determining whether time for processing the mobile terminated traffic reaches a second time threshold;

Step s35, if time for processing the mobile terminated traffic does not reach the second time threshold, continuing to perform the network searching of the first user card according to the stored network searching information; and Step s36, if the time for processing the mobile terminated traffic reaches the second time threshold, restarting the network searching of the first user card.

The method further comprises presetting the second time threshold in the mobile phone. The second time threshold is set in a range of no more than ten seconds.

When the time for processing mobile terminated traffic is smaller than the second time threshold, (for example the second time threshold is ten seconds), i.e. the time for processing mobile terminated traffic of the second user card is so small that communication network environment varies a little in such short time. The network searching information of the first user card can be continued to be used. After completing the mobile terminated traffic of the second user card, the network searching of the first user card is continued to be performed according to the stored network searching information. The time for restarting the network searching is avoided, thereby raising the efficiency of the network searching.

Figure 5:
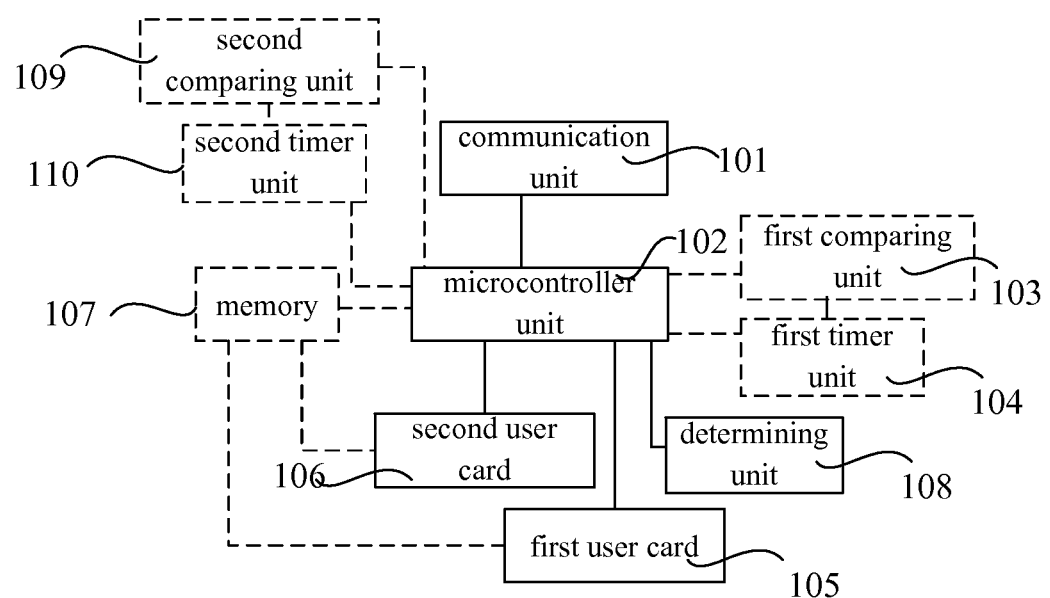
FIG. 5 schematically shows a multi-card multi-standby mobile phone according to an embodiment of the invention.

Correspondingly, a multi-card multi-standby phone is disclosed. Referring to FIG. 5, a multi-card multi-standby mobile phone according to an embodiment of the invention is illustrated. The multi-card multi-standby mobile phone includes communication unit 101, a microcontroller unit 102, a determining unit 108, a first user card 105 and a second user card 106.

The microcontroller unit 102 is adapted for processing network searching and mobile phone traffic. When receiving a service request of the second user card 106 during a process of the network searching of the first user card 105, the determining unit 108 determines if the service request corresponds to mobile originated traffic or mobile terminated traffic. When the service request corresponds to the mobile originated traffic, the mobile originated traffic is temporarily suspended and the network searching of the first user card 105 is continued to be performed. When the service request corresponds to the mobile terminated traffic, the network searching of the first user card 105 is temporarily suspended, the mobile terminated traffic is firstly processed, and the network searching of the first user card 105 is continued to be performed after completing the mobile terminated traffic.

The communication unit 101 is adapted for transmitting data between the mobile phone and communication network.

The determining unit 108 connected to the microcontroller unit 102 is adapted for determining if the service request corresponds to mobile originated traffic or mobile terminated traffic and sending a determining result to the microcontroller unit 102.

In order to avoid delaying much time for the mobile originated traffic of the second user card 106 and impacting the use of the mobile phone, the multi-card multi-standby mobile phone may include a first timer unit 104 and a first comparing unit 103 which are connected to the microcontroller unit 102 respectively.

When the service request corresponds to the mobile originated traffic and the mobile originated traffic is temporarily suspended and network searching of the first user card is performed, the microcontroller unit 102 controls the first timer unit 104 to measure the time for the network searching and controls the first comparing unit 103 to compare the time for the network searching measured by the first timer unit 104 with a first time threshold. If the time for the network searching does not reach the first time threshold, the mobile originated traffic is processed after completing the network searching. If the time for the network searching reaches the first time threshold, the network searching is stopped, the mobile originated traffic is restored to process, and the network searching is performed after completing the mobile originated traffic.

The first timer unit 104 connected to the microcontroller unit 102 is adapted for measuring the time for network searching.

The first comparing unit 103, connected to the first timer unit 104, set with the first time threshold, is adapted for comparing the time for the network searching measured by the first timer unit with the first time threshold and sending a comparing result to the microcontroller unit 102. The first time threshold is set as 5 s. Preferably, the first time threshold is set as 2 s.

In order to avoid decreasing efficiency of the network searching, the multi-card multi-standby mobile phone may include a memory 107, a second timer unit 110 and a second comparing unit 109 which are connected to the microcontroller unit 102 respectively.

The microcontroller unit 102 is adapted for storing the network searching information of the first user card 105, when the service request corresponds to the mobile terminated traffic and the network searching of the first user card 105 is temporarily suspended. When processing the mobile terminated traffic, the microcontroller unit 102 controls the second timer unit 110 to measure the time for processing the mobile terminated traffic, and controls the second comparing unit 109 to compare the time measured by the second timer unit 110 with a second time threshold. If the time for processing the mobile terminated traffic does not reach the second time threshold, the network searching of the first user card 105 is continued to be performed according to the stored network searching information after completing the mobile terminated traffic. If the time for processing the mobile terminated traffic reaches the second time threshold, the network searching is restarted after completing the mobile terminated traffic. The memory 107 is adapted for storing the network searching information of the first user card, such as a searched frequency point information or a searched cell information etc.

The second timer unit 110 is adapted for measuring the time for processing the mobile terminated traffic.

The second comparing unit 109 is connected to the second timer unit 110. The second comparing unit 109 set with the second time threshold is adapted for comparing the time for processing the mobile terminated traffic of the second user card with the second time threshold. In order to avoid a long time in which communication network environment of the first user card varies, the second time threshold is less than or equal to 10 s.

For example, a triple-card triple-standby mobile phone includes three types of user cards which are A user card, B user card and C user card. When the mobile phone is in a standby state, the A user card performs network searching because of losing network. The B user card is in a good network status and receives a service request for a call from other mobile phone. The mobile phone stops the network searching of the A user card and receives the related information of the call sent by other mobile phone. The network searching of the A user card is performed after finishing the call. For example, during the process of the network searching for the A user card, the mobile phone user sends, using the B user card, a service request of sending short messages to other mobile phone. The A user card has found a frequency point for camping on but system information has not been received, i.e. closing stages to the end of the network searching. The service request for sending short messages of the B user card is not processed temporarily. The service request for sending short messages is processed till completing the network searching for the A user card. Similarly, when conflict occurs between network searching of the C user card and traffic of the A user card (or B user card), similar method may be adopted.

In above embodiments of the present invention, the first user card and the second user card (or the triple-card triple-standby mobile phone) are only used for illustrating, not for limiting the present invention. The multi-card multi-standby mobile phone may include a fourth user card, a fifth user card and so on. Those skilled in the art may make various variations and modifications according to the embodiments.

In conclusion, in the method for resolving conflict between the network searching and the traffic of the present invention, according to the mobile originated traffic and mobile terminated traffic, different priorities are set for the network searching and the traffic respectively. When the conflict occurs between the network searching and the traffic, the network searching and the traffic will be successfully completed according to the preset priories.

For the conflict between the network searching and the mobile terminated traffic, the mobile terminated traffic is firstly processed, thereby avoiding impact of the network searching to the mobile terminated traffic.

For the conflict between the network searching and the mobile originated traffic, the mobile originated traffic is firstly delayed by a period of time and the network searching is performed, thereby raising the efficiency of the network searching. Moreover, a time threshold is set for the network searching, thus decreasing the delay time of the mobile originated traffic and the impact of the network searching to the mobile originated traffic.

The invention is described above in connection with preferred embodiments. However, the preferred embodiments shall not limit the scope of the invention. Those skilled in the art can make various alternations and modifications to the preferred embodiments without departing from the spirit and scope of the invention. Therefore, the scope of the invention shall be defined as in the appended claims.

The invention claimed is:

1. A method for resolving conflict between network searching and traffic of a multi-card multi-standby mobile phone, comprising:
   determining if a service request corresponds to mobile originated traffic or mobile terminated traffic, when a second user card receives the service request during a process of the network searching of a first user card;
   temporarily suspending the mobile originated traffic and continuing to perform the network searching of the first user card, when the service request corresponds to the mobile originated traffic; and
   temporarily suspending the network searching of the first user card, processing the mobile terminated traffic firstly, and continuing to perform the network searching of the first user card after completing the mobile terminated traffic, when the service request corresponds to the mobile terminated traffic;
   wherein, when temporarily suspending the mobile originated traffic and continuing to perform the network searching of the first user card, time for the network searching is measured and whether the time for the network searching reaches a first time threshold is determined; processing the mobile originated traffic of the second user card after completing the network searching if the time for the network searching does not reach the first time threshold; and stopping the network searching, restoring processing the mobile originated traffic of the second user card if the time for the network searching reaches the first time threshold, and performing the network searching after completing the mobile originated traffic;
   wherein, before temporarily suspending the mobile originated traffic, when a frequency point for camping on is found and system information has not been received completely during the process of the network searching of the first user card, the first time threshold is 2 seconds.

2. The method according to claim 1, wherein the mobile originated traffic includes a call service, a short message service and BLUETOOTH service, which are sent from the mobile phone to other wireless communication devices.

3. The method according to claim 1, wherein the mobile terminated traffic includes a call service, a short message service and BLUETOOTH service, which are sent from other wireless communication devices to the mobile phone.

4. The method according to claim 1, wherein, when the service request corresponds to the mobile terminated traffic, after suspending the network searching of the first user card, network searching information is stored and mobile terminated traffic is processed then, the network searching of the first user card being continued to be performed according to the stored network searching information when time for processing the mobile terminated traffic does not reach a second time threshold.

5. The method according to claim 4, wherein, when the time for processing the mobile terminated traffic reaches the second time threshold, the network searching of the first user card is restarted.

6. The method according to claim 4, further comprising presetting the second time threshold in the mobile phone.

7. The method according to claim 4, wherein the second time threshold is less than or equal to 10 seconds.

8. A multi-card multi-standby mobile phone, comprising:
   at least two types of user cards;
   a communication unit for transmitting communication information;
   a microcontroller unit for processing network searching and traffic, when a second user card receives a service request during a process of the network searching of a first user card, starting a determining unit and receiving a determining result from a determining unit; if the determining result shows that the service request corresponds to mobile originated traffic, temporarily suspending the mobile originated traffic and continuing to perform the network searching of the first user card; if the determining result shows that the service request corresponds to mobile terminated traffic, temporarily suspending the network searching of the first user card, processing mobile terminated traffic firstly, and continuing to perform the network searching of the first user card after completing the mobile terminated traffic; and
   the determining unit for determining if the service request corresponds to mobile originated traffic or mobile terminated traffic;
   wherein the multi-card multi-standby mobile phone further comprises a first timer unit and a first comparing unit which are connected to the microcontroller unit respectively;
   wherein, when the determining result shows that the service request corresponds to the mobile originated traffic and the mobile originated traffic is temporarily suspended and the network searching of the first user card is performed, the microcontroller unit is for starting the first timer unit, and receiving a comparing result from the first comparing unit; if the comparing result shows that time for the network searching does not reach a first time threshold, processing the mobile originated traffic after completing the network searching; if the comparing result shows that the time for the network searching reaches the first time threshold, stopping the network searching, restoring the mobile originated traffic and performing the network searching after completing the mobile originated traffic;
   wherein the first timer unit is for measuring the time for the network searching of the first user card after the first timer unit being started; and
   wherein the first comparing unit set with the first time threshold is for comparing the time for network searching measured by the first timer unit with the first time threshold, and sending the comparing result to the microcontroller unit;
   wherein, before temporarily suspending the mobile originated traffic, when a frequency point for camping on is found and system information has not been received completely during the process of the network searching of the first user card, the first time threshold is 2 seconds.

9. The multi-card multi-standby mobile phone according to claim 8, further comprising a memory, a second timer unit and a second comparing unit which are connected to the microcontroller unit respectively;
   wherein, when the determining result shows that the service request corresponds to the mobile terminated traffic and the network searching of the first user card is temporarily suspended, the microcontroller unit is for storing network searching information of the first user card in the memory, processing the mobile terminated traffic, starting the second timer unit, receiving a comparing result from the second comparing unit; if the comparing result shows that time for processing the mobile terminated traffic does not reach a second time threshold, continuing to perform the network searching of the first user card according to the network searching information stored in the memory after completing the mobile terminated traffic; and if the comparing result shows that the time for processing the mobile terminated traffic reaches the second time threshold, restarting the network searching after completing the mobile terminated traffic;

wherein the memory is for storing the network searching information;

wherein the second timer unit is for measuring the time for the microcontroller unit to process the mobile terminated traffic when the second timer unit is started; and wherein the second comparing unit set with the second time threshold is for comparing the time for processing the mobile terminated traffic measured by the second timer unit with the second time threshold, and sending the comparing result to the microcontroller unit.

* * * * *